(12) United States Patent
Schuchard et al.

(10) Patent No.: US 6,505,933 B2
(45) Date of Patent: *Jan. 14, 2003

(54) SPRING HINGE FOR EYEWEAR

(75) Inventors: Klaus Schuchard, Neuenbürg (DE); Reiner Wagner, Ispringen (DE)

(73) Assignee: OBE Ohnmacht & Baumgartner GmbH & Co. KG (DE)

( * ) Notice: Subject to any disclaimer, the term of this patent is extended or adjusted under 35 U.S.C. 154(b) by 0 days.

This patent is subject to a terminal disclaimer.

(21) Appl. No.: 09/822,065

(22) Filed: Apr. 2, 2001

(65) Prior Publication Data

US 2001/0038436 A1 Nov. 8, 2001

Related U.S. Application Data

(63) Continuation-in-part of application No. 08/909,618, filed on Aug. 12, 1997, now abandoned, which is a continuation-in-part of application No. 08/098,121, filed on Jul. 27, 1993, now Pat. No. 5,657,107.

(30) Foreign Application Priority Data

Jul. 27, 1992 (DE) ............................................ 92 10 056
Apr. 28, 1993 (DE) ...................................... G 93 06 387

(51) Int. Cl.⁷ .............................. G02C 5/16; G02C 5/22
(52) U.S. Cl. ......................... 351/113; 351/153; 16/228
(58) Field of Search ................................. 381/113, 153, 381/111, 114, 115, 41; 16/228

(56) References Cited

U.S. PATENT DOCUMENTS

| 4,991,258 A | | 2/1991 | Drlik |
| 5,028,367 A | | 7/1991 | Wei |
| 5,657,107 A | * | 8/1997 | Wagner et al. ............... 351/113 |

FOREIGN PATENT DOCUMENTS

| DE | 2238730 | 3/1978 |
| DE | 2126989 | 7/1980 |
| DE | 3213174 | 5/1984 |
| DE | 3401213 | 7/1985 |
| DE | 2920055 | 6/1988 |
| DE | 9114917 | 3/1993 |
| DE | 9301985 | 4/1993 |
| DE | 4332971 | 3/1995 |
| EP | 0395939 | 7/1990 |
| FR | 2664990 | 1/1992 |

* cited by examiner

Primary Examiner—Hung Xuan Dang
(74) Attorney, Agent, or Firm—Ostrolenk, Faber, Gerb & Soffen, LLP

(57) ABSTRACT

A spring hinge for eyewear with assembly locking elements that snap-in to place. The locking elements are in the form of a bent spring pin that is insertable in a compressed form and which, once inserted, expands to engage a stepped recess, locking it in place. The bent spring pin is formed from a single T-shaped blank allowing economical manufacturing and assembly, resulting in a secure, compact spring hinge.

20 Claims, 14 Drawing Sheets

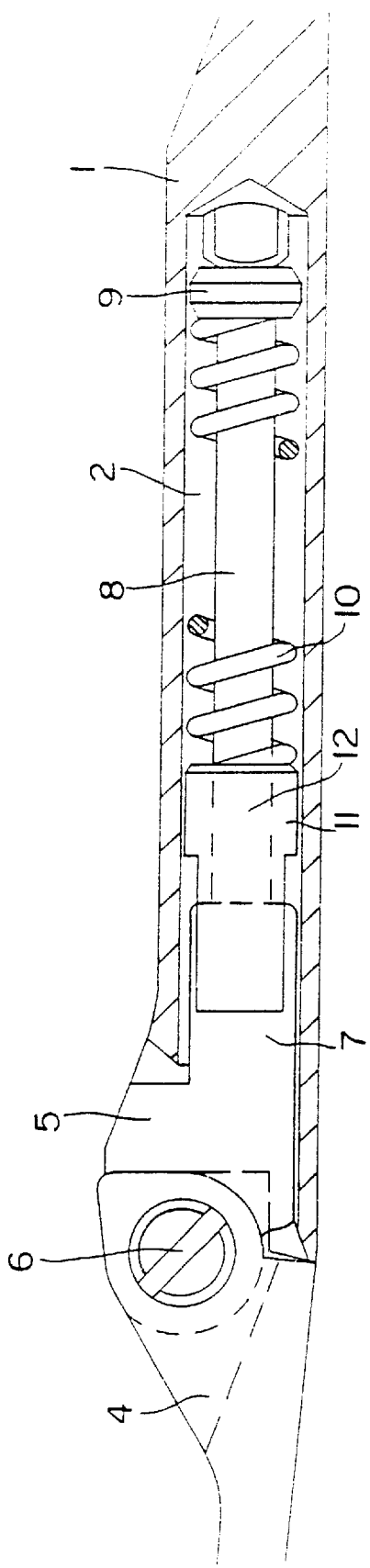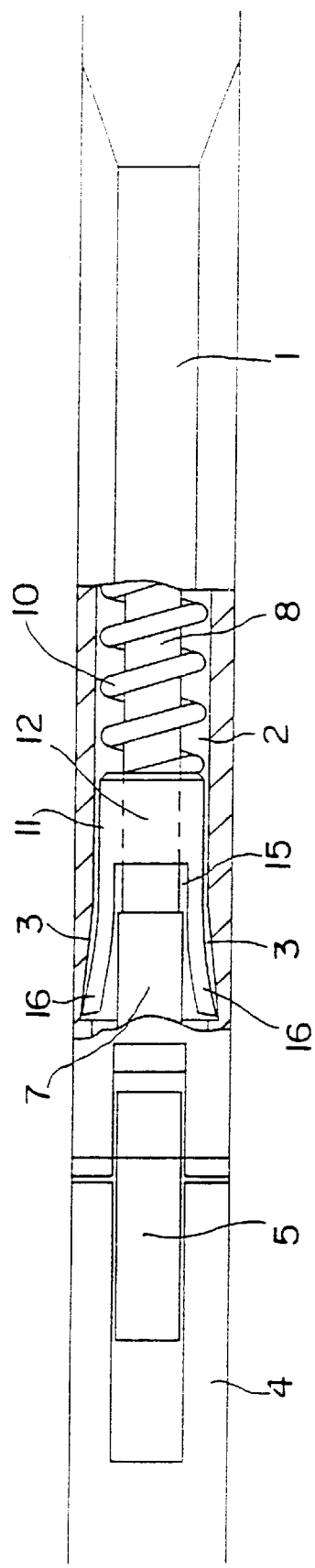

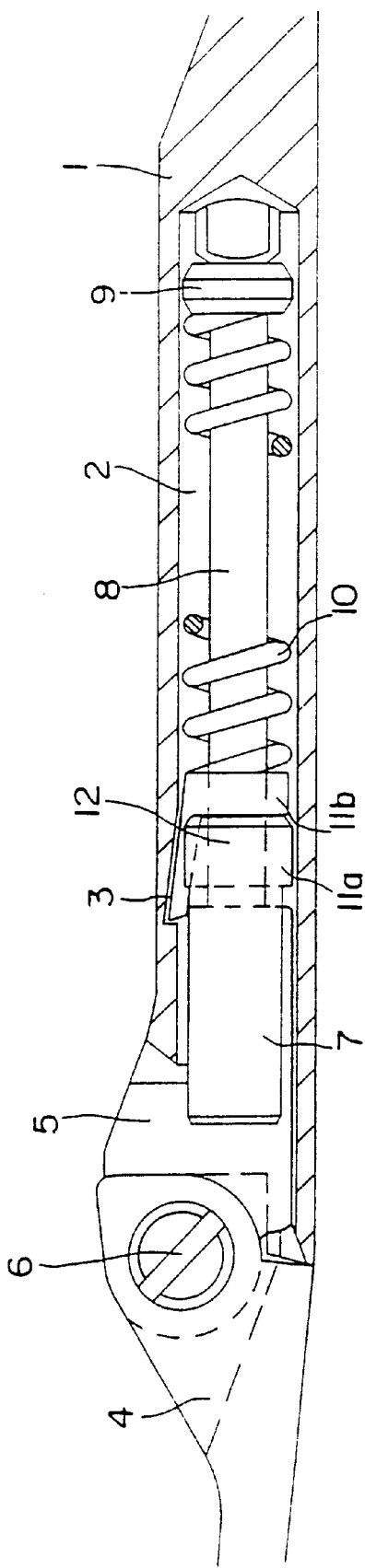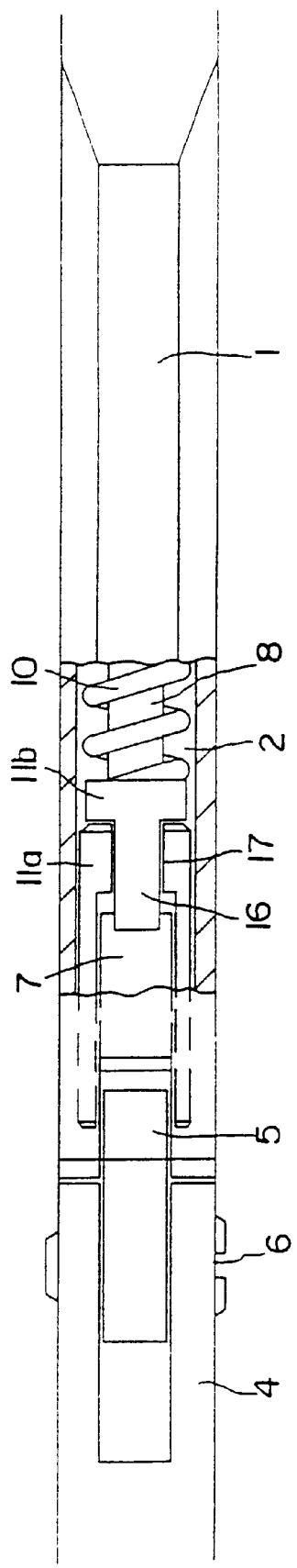

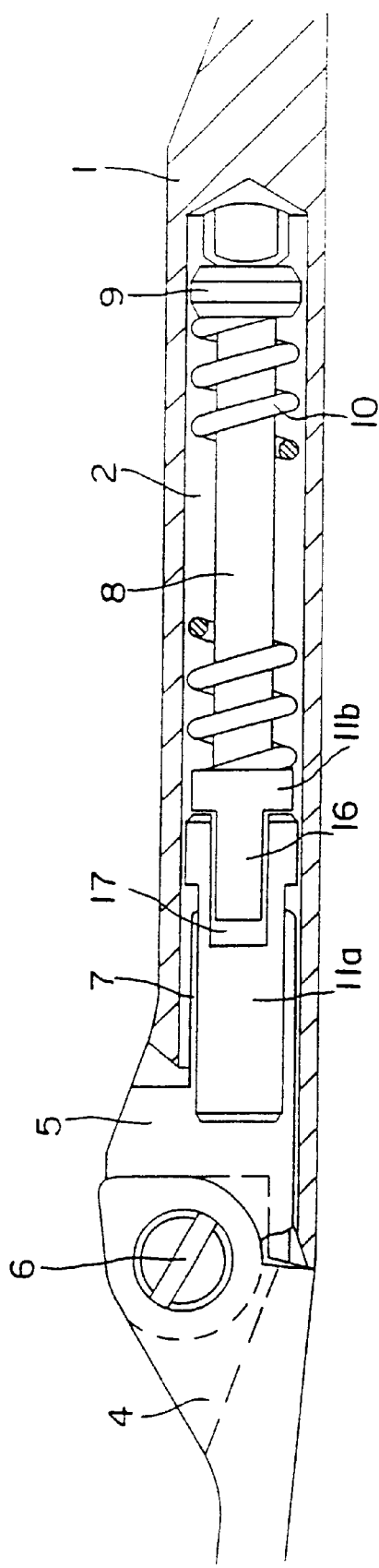
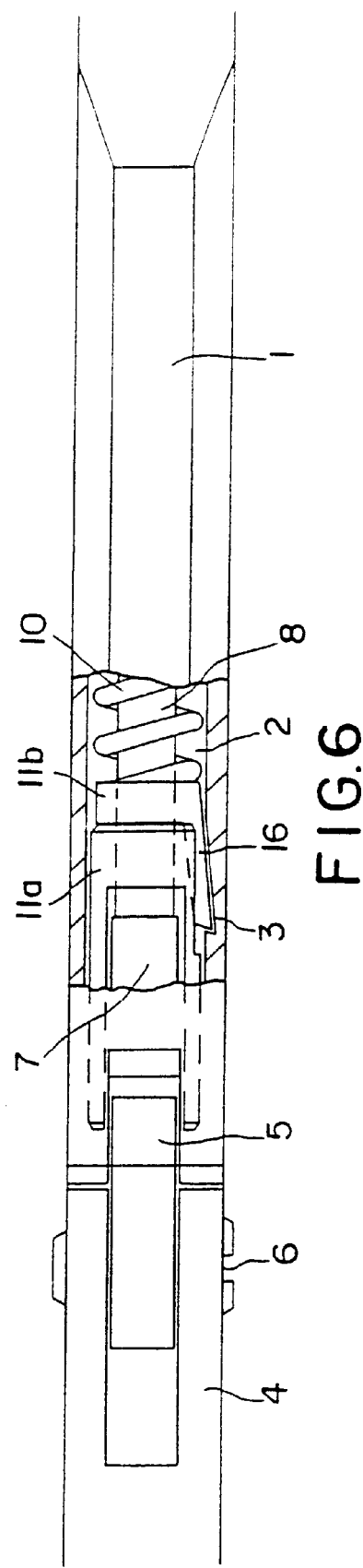
FIG.5
FIG.6

SPRING HINGE FOR EYEWEAR

This application constitutes a Continuation-In-Part of U.S. patent application Ser. No. 08/909,618 Aug. 12, 1997, now abandoned which is a Continuation-In-Part of U.S. patent application Ser. No. 08/098,121 Jul. 27, 1993, now U.S. Pat. No. 5,657,107 and discloses further modifications and improvements.

BACKGROUND OF THE INVENTION

1. Field of the Invention

The invention relates to a spring hinge for eyewear, that enables to open the temples of eyeglasses beyond the regular position of use and that is intended for use with the temples of eyeglasses with the characteristics set forth in the introductory clause of claim 1.

2. Description of the Related Art

From patent EP 90 107 388 are known spring hinges for eyewear that allow the opening of the temples beyond the regular position of use and that are intended for use with the temples of eyeglasses. Such a hinge spring is provided with a locking element having a U-shaped cross section, presenting a projection on the first of its legs on its free end toward the outside, in which the locking element is lodged in a sliding element and in a first recess of same in such a manner, that its two legs point away from the axis of the hinge. The locking element abuts in a spring-loaded manner the shoulder of a second recess with its projection, thus constituting a stop for a spring plunger.

Furthermore, from GB-2 248 121 A is known a spring hinge for eyewear, in which a cylindrical locking element is provided with a circular shoulder, wherein the locking element is diametrically divided by a slot. The shoulder engages in a recess provided in the temple of the glasses.

A disadvantage of such a design of the spring hinge is that the locking effect by the locking element can be obtained only by a spring tension acting upon the locking element, since the locking element is spread by the spring itself or by a spring plunger. A further disadvantage is that a spring guide pin must preload the required spring to ensure that the locking effect is attained. This, in turn, has the disadvantage that the assembly is relatively costly and difficult.

The present invention has the task to further develop the known hinge, so that an interlocking of the locking element with the frame is automatically attained.

In accordance with the invention, this task is solved by the object of claim 1. Further advantageous embodiments are objects of the subclaims.

SUMMARY OF THE INVENTION

The spring hinge according to the invention is characterized by the fact that the locking element presents at least one snap-in pin bent in direction of the wall of the recess. Because of the bent, spring snap-in pin occurs an automatic locking of the snap-in pin in the stepped recess. Therefore, no additional preloading is required, which reduces the assembly costs.

In the case of a locking element designed in one piece, the snap-in pin or the snap-in pins can be produced at the same time as the locking element is prepared and/or manufactured. Therefore, the manufacture of the snap-in pin together with the locking element does not require any additional components that must be connected to the locking element.

In the case of a locking element that presents a top from which extend the snap-in pins, and in which a sliding element is installed in a slidable manner between the snap-in pins, on one hand, such locking element ensures the locking and, on the other hand, the locking element itself guides the sliding element.

Therefore, the locking element has two operational functions. This design of the locking element minimizes the number of elements making up the spring hinge.

If the locking element is designed in such a manner that it presents a recess into which the snap-in pin can be lowered, the dimensions of the locking element or of the recess in the temple of the glasses, respectively, are reduced, since the snap-in pin is lowered into the recess at the time of its assembly, and it snaps into the second recess after having reached it from the recess in the locking element.

The snap-in pin or snap-in pins, respectively, can be produced from a lamina, that is a stamped metal part. This design has the advantage that the locking element can be manufactured in a simple manner, which makes it cost-effective. The snap-in pins are then bent away from the lamina. The bending angle is less than 90°.

In order to prevent the danger of breaking, it is advantageous if the locking element is made out of a T-shaped blank, whereby the top of the T-shaped blank is bent partly cylindrically. This has the advantage that, e.g., in the case of spring hinges with a recess in which is installed a spring guide pin, the spring guide pin extends along the cylindrical part of the locking element, which would obviate the need of manufacturing an opening for the spring guide pin.

The two legs of the T-shaped blank are advantageously designed at a angle to each other. After the blank is bent, a locking element with a slot for a guide pin. The slot is of such dimensions, that the locking element rests with play on the guide pin. The bent locking element presents a tilted plane opposite the longitudinal axis of the spring hinge, so that, because of the effect of a spring resistance, the snap-in pin engages into the recess.

Prior art spring hinged eye glasses or spectacles have the disadvantage that the spring is fully compressed when the bows are spread apart substantially beyond their normal position. This extended out-turning of the bows can result in damage of the spring or other parts of the spring hinge.

The prior art structures use stops which limit the outward movement of the bow beyond a normal position. Such structure is shown in U.S. Pat. No. 4,991,258 and in German Utility Model G11417. For example, in the German Utility Model there is disclosed an external stop for preventing excessive outward movement of the bow. The difficulty with this construction utilizing an external stop is that a manufacturer is not able to guarantee the proper function, since the function mostly depends on the work of the frame manufacturer who links the middle part or frame and the bow by the spring hinge.

In U.S. Pat. No. 4,991,258 the spring hinge disclosed uses an internal stop. However, this solution is complicated and requires a number of additional parts. It lacks simplicity.

It is an object of the improvement here to provide a spring hinge having a stop which is easily fabricated and which enables the manufacturer to guarantee the function of the stop.

BRIEF DESCRIPTION OF THE FIGURES

The figures describe the further advantages and characteristics of the spring hinge according to the invention and wherein:

FIG. 1 shows a longitudinal view of an operable spring hinge;

FIG. 2 shows a top view of the spring hinge according to FIG. 1 with a portion broken away;

FIG. 3 shows a longitudinal view of a second embodiment of a spring hinge;

FIG. 4 shows a top view of the spring hinge according to FIG. 3 with a portion broken away;

FIG. 5 shows a longitudinal view of a third embodiment of an operable spring hinge;

FIG. 6 shows the top view of the spring hinge according to FIG. 5;

DETAILED DESCRIPTION

Figure 7:
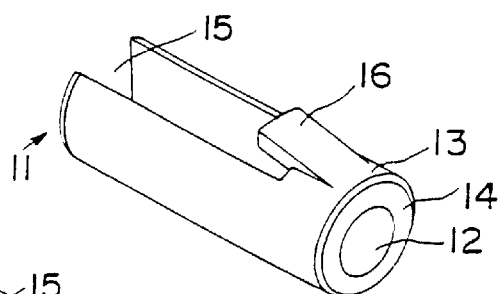
FIG. 7 shows a single-piece locking element with a snap-in pin.

FIGS. 1 to 6 show a spring hinge for eyewear, that enables to open the temples beyond their regular position of use, and that is intended to be used with a temple [of eyeglasses] 1. The temple 1 presents at its front end, closer to a center part of a frame for eyeglasses (not shown) when assembled, a first longitudinal recess 2 in which is located a second recess with a stepped rim at its end closer to the center part when assembled.

The spring hinge consists of a hinge center piece 4 that is provided to be fastened to the center part of a frame for eyewear, and of a temple hinge 5 that can be connected with the hinge center piece 4 swiveling around a hinge axis 6.

The temple hinge 5 presents a sliding element 7, that engages into the recess 2. The sliding element 7 is connected with a spring guide pin 8. This spring guide pin 8 presents a stop 9 at its end facing the sliding element 7. The spring guide pin 8 passes through a spring 10. A locking element 11 is provided between the sliding element 7 and the spring 10. The locking element is provided with a through-hole 12, through which extends the spring guide pin.

Figure 11:
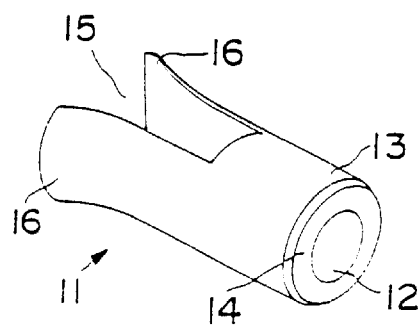
FIG. 11 shows a locking element with two snap-in pins.

FIGS. 1 and 2 show a first embodiment of a locking element. FIG. 11 shows the locking element by itself.

The locking element is of cylindrical shape. However, this is not absolutely necessary. It is possible to use also other geometries. The cross sectional geometry of the locking element 11 is preferably adapted to the cross sectional geometry of the recess 2 or vice-versa.

As it can be seen from FIG. 11, the cylindrical locking element 11 presents a top 13 provided with an axial bore hole 12. The guide pin 8 passes through the bore hole 12. The front plane 14 serves as limit stop for the spring 10.

The cylindrical locking element presents a recess 15, into which engages, at least partially, the sliding element 7. The recess 15, of essentially rectangular cross section, of which the geometry is adapted to the sliding element 7, forms two outwardly bent snap-in pins 16 that extend in axial direction from the head. These snap-in pins are spring mounted.

The spring hinge is assembled in such a manner that the locking element 11 is placed on the temple hinge 5 with its sliding element 7. Subsequently, the spring guide pin 8 with the spring 10 and the stop 9 is connected to the sliding element 7. This connection can be obtained, e.g., by means of a screw connection, for which a taphole can provide in the sliding element, while the spring guide pin 8 presents an outside thread. The temple hinge 5 with its sliding element 7 and the spring guide pin can also be designed in one piece. The thus produced component is subsequently pushed into the spring saddle 1 until the snap-in pins 16 audibly engage into the recess 3.

The sliding element 7, that is provided inside the locking element 11, can slide a determined distance out of the first recess 2 against the spring resistance of the spring 10. Hereby it is advantageous, that the sliding element 7 be moved over the total distance in the sliding element 11, over which the sliding element 7 can slide out, since the sliding element 7 shortens the bending point of the snap-in pin 16, whereby an improved reliability is obtained.

FIG. 2 illustrates the recess 3 in the recess 2 only in the area of the snap-in pins 16. This is not necessary. The recess 3 can be channeled around recess 2. A continuous recess is preferable if the locking element 11 with its snap-in pins 16 can be installed in the temple of the eyewear regardless of its position. This would be the case, e.g., if the sliding element 11 had a circular cross section.

In the below description of the FIGS. 3 to 6 are used the same numbers for the same components.

The spring hinge, as illustrated in FIGS. 3 and 4, differs from the spring hinge according to FIGS. 1 and 2 in the design of the locking element 11 and of the recess 3.

The recess 3 is provided only in a certain area of the recess 2.

Figure 9:
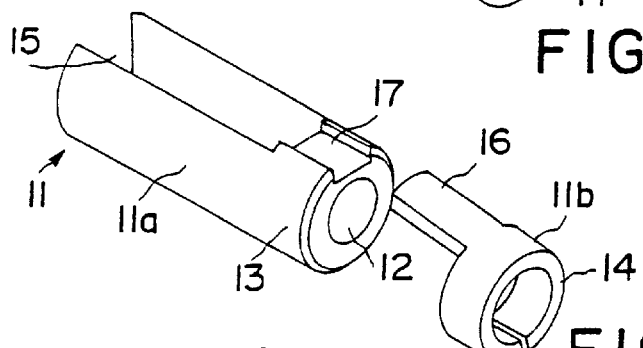
FIG. 9 shows a second embodiment of a two-piece locking element with a snap-in pin.

FIG. 9 shows a separate illustration of the locking element according to FIG. 3.

The locking element 11 is made up of two parts. It consists of a first part 11a and of a second part 11b. The part 11a is of cylindrical shape and presents a bore hole 12 for the insertion of the spring guide pin 8. In part 11a is provided a recess 15 extending in an axial direction, in which is guided the sliding element 7 in its assembled condition. The top 13 of the part 11a presents a recess 17 extending in an axial direction. The dimensions of the recess 17 essentially correspond to the width and the thickness of the snap-in pin 16. The recess 17 extends in an axial direction.

The recess 17 serves for the positioning of the part 11b and also to facilitate the assembly, since during the assembly of the spring hinge, the inside surface of the recess 2 slides on the snap-in pin 16, thus pressing the snap-in pin 16 into the recess 17. After the snap-in pin 16 reaches the recess 3, it snaps from recess 17 into the recess 3.

Figure 13:
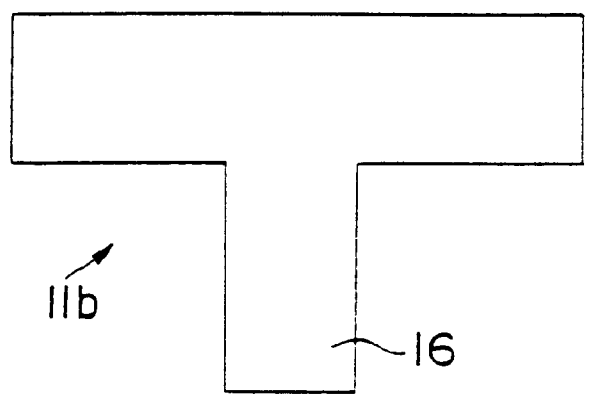
FIG. 13 shows the blank for the snap-in pin according to FIGS. 8 and 9.

FIG. 13 illustrates a blank for the part 11b. The blank is T-shaped. The top of the T-shaped blank is bent round. The front surface 14 of part 11b serves as support for spring 10.

A shoulder can be provided at the top 13 of the part 11a, of which the outside diameter corresponds to the inside diameter of part 11b. The part 11b can then be slipped over part 11a, so that the locking element becomes a one-piece component.

The spring hinge, as illustrated in FIGS. 5 and 6, differs from the presentation of the spring hinge in FIGS. 3 and 4 in the placing of part 11b on part 11a of the locking element 11.

Figure 8:
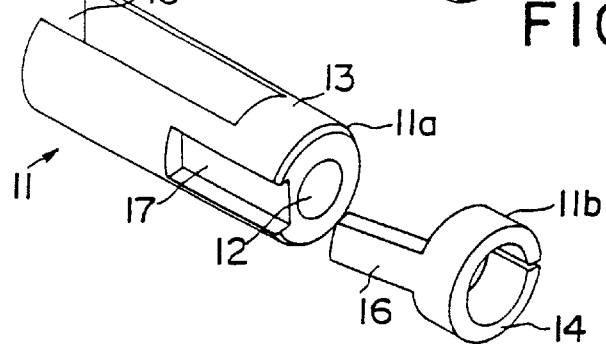
FIG. 8 shows a two-piece locking element with a snap-in pin.

FIG. 8 shows the presentation of the locking element 11.

The locking element 11 is made up of two parts and consists of a part 11a and a part 11b The part 11b according to FIG. 8 corresponds to part 11b in FIG. 9.

Part 11a is cylindrical and presents a bore hole 12 for the insertion of the spring guide pin 8. The cylindrical part 11a presents a recess 15 extending in an axial direction for the insertion of sliding element 7.

The lateral surface of part 11a is provided with a recess 17, of which the dimensions with respect to length, width and depth essentially correspond to the dimensions of the snap-in pin 16.

As it can be seen from FIG. 8, the periphery of recess 17 is offset approximately 90° with respect to recess 15. This, however, is not necessary. It is decisive that the snap-in pin 16 is installed in such a manner that the recess 15 does not partly overlap it. Such arrangement is of particular advantage if, as it can be seen from FIG. 5, the transversal extension of sliding element 7 is so large that there is insufficient space to install the snap-in pin 16.

FIGS. 7 and 8 illustrate two other embodiments of the locking element 11.

FIG. 7 shows a one-piece cylindrically shaped locking element 11. The locking element 11 is provided with a recess 15 for the insertion of a sliding element 7. Partly overlapping the recess 15 is provided a snap-in pin 16, that extends from the head 13 to the open end of the recess 15. The snap-in pin 16 is outwardly bent. The locking element 11 is provided with a bore hole 12 for the insertion of a spring guide pin 8, as well as a front surface 14 to support a spring 10.

Figure 10:
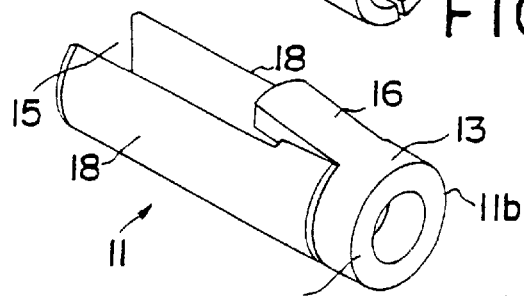
FIG. 10 shows a locking element with a snap-in pin.

FIG. 10 illustrates a locking element 11 with a snap-in pin 16. From the head 13 extend parallel running flaps 18, that are tip-stretched at the head 13.

FIG. 10 shows another embodiment of a locking element 11. The locking element is a turned/milled piece.

Figure 12:
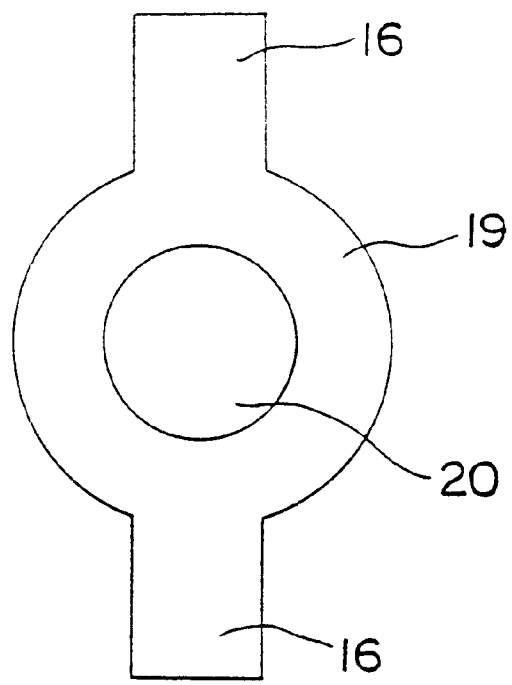
FIG. 12 shows a first embodiment of the blank for a locking element.

FIG. 12 illustrates a blank, that could be a stamped metal piece. The blank presents a lamina 19 with an opening 20 through which can pass the spring guide pin 8 after it is assembled. At the periphery of the lamina 19 is provided at least one flap extending in a radial direction which, after bending, serves as a snap-in pin. According to FIGS. 8 or 9, the lamina 19 can be placed, for example, at part 11a, replacing part 11b.

FIG. 13 shows a blank for part 11b.

It is understood that it is not necessary that the illustrated locking elements be cylindrical. The outside geometry of the locking elements 11 can be adapted to the geometry of the recess 2.

Also the recess 15, that is provided as guide for the sliding element 7, can present different geometries. Decisive herein is that the recess 15 is provided as guide for the sliding element 7.

Figure 14:
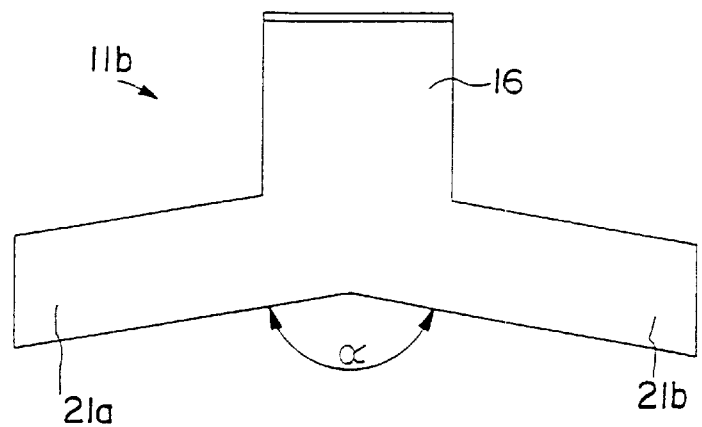
FIG. 14 shows another embodiment of the blank for a locking element.

FIG. 14 shows a second embodiment of a blank for a locking element component 11b. The blank for the locking element component 11b according to FIG. 14 differs from the blank for the locking element component 11b according to FIG. 13 in that the two legs 21a, 21b of the T-shaped blank are designed so as to form an angle a to each other.

Figure 15:
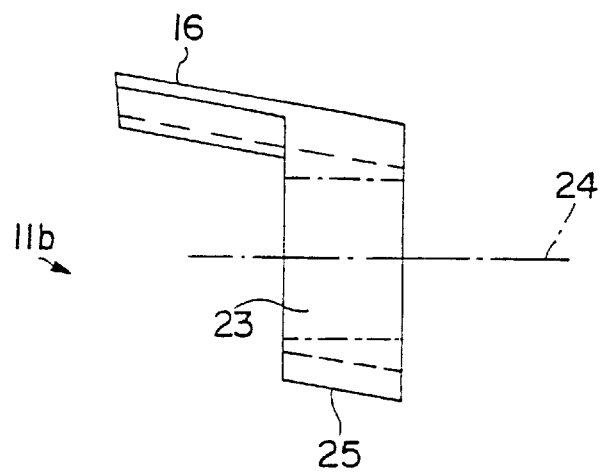
FIG. 15 shows a front view of a locking element according to FIG. 14.
Figure 16:
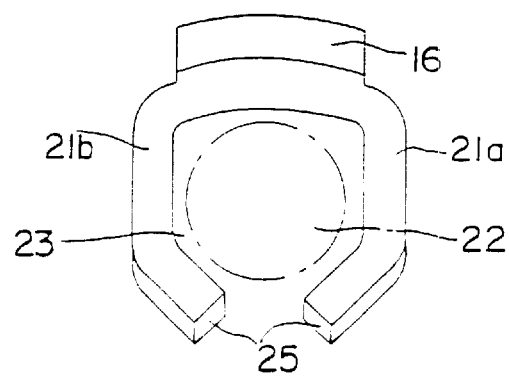
FIG. 16 shows a lateral view from the left of a locking element according to FIG. 14.

After bending the blank, one obtains a locking element component 11b as shown in FIGS. 15 and 16. After bending, the locking element component 11b presents a through-hole 23 through which passes a guide pin 22 in its assembled condition. The through-hole 23 must be dimensioned in such a manner that the locking element component 11b can rest with play on the guide pin 22. The bent locking element component 11b presents a tilted plane 25 with respect to the longitudinal axis of a spring hinge, so that due to the effect of a spring resistance the snap-in pin 16 can engage in a recess 3. In that, the spring effect pushes out the part of the locking element.

Figure 20:
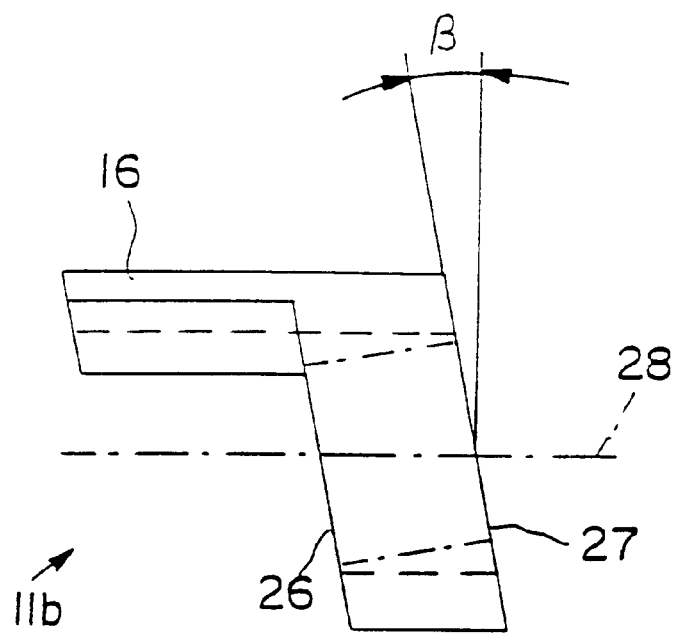
FIG. 20 shows a front view of another embodiment of a locking element.
Figure 21:
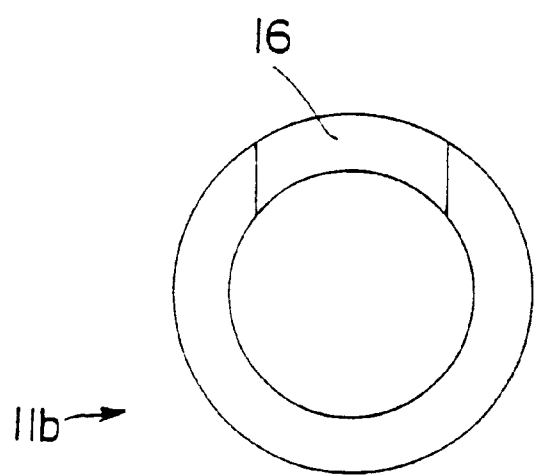
FIG. 21 shows a lateral view from the left of a locking element according to FIG. 20.

The locking element according to FIGS. 20 and 21 differs from the locking element according to FIG. 14 in that the locking element is made out of a tube. The manufacturing process is through a metal cutting. The locking element presents two essentially parallel planes 26, 27 facing each other. The planes are tilted at an angle β with respect to the axis of the hollow section, so that because of the spring resistance action the snap-in pin 16 can engage in a recess 3.

Figure 17:
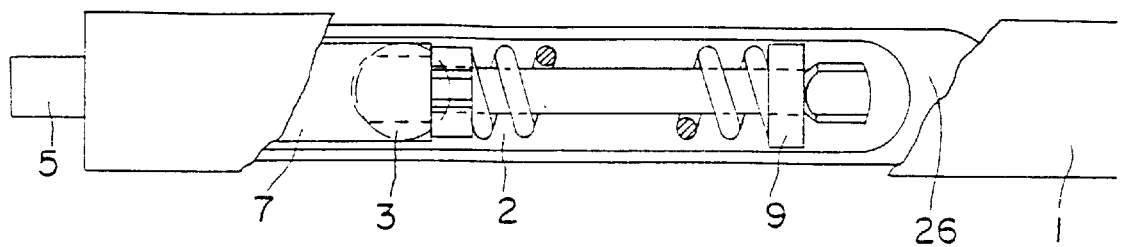
FIG. 17 shows a top view of a spring hinge with a locking element according to FIG. 15.
Figure 18:
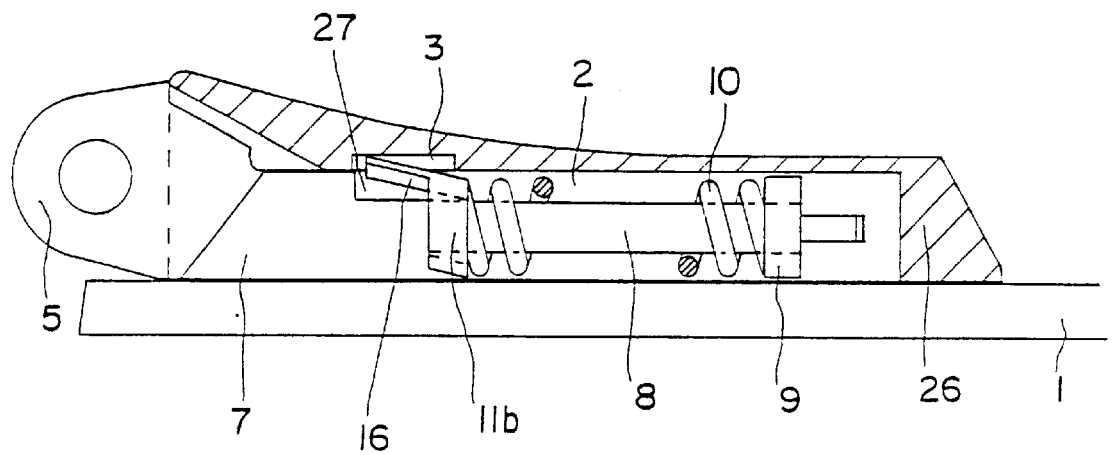
FIG. 18 shows a front view section of the spring hinge according to FIG. 17.
Figure 19:
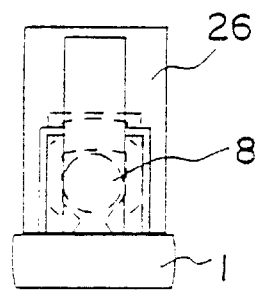
FIG. 19 shows the view from the left of the spring hinge according to FIG. 18.

FIG. 17 illustrates an assembled spring hinge with a locking element component 11b according to FIG. 14.

The spring hinge is provided with an oblong guide housing 26 that is mounted on a temple [of eyeglasses] 1. The housing 26 is provided with an oblong recess 2 in which is located a second recess 3 with a stepped rim and, when assembled, closer to the end of the center part. Into the recess 2 engages a sliding element 7 that is connected with a spring guide pin 8. The spring guide pin 8 is provided at the end facing the sliding element 7 a stop 9. The spring guide pin 8 passes through the spring 10. Between the sliding element 7 and the spring 10 is mounted the locking element component 11b. the locking element component 11b is provided with a snap-in pin 16, that engages into the second recess 3.

In the presentation according to FIG. 17, the snap-in pin 16 of the locking element component 11b engages into the recess 3. This is attained by the spring action of spring 10, insofar as the latter lifts the locking element component 11b. One end of the spring 10 abuts the locking element component.

The sliding element 7 is provided with a recess 27 in which is engaged the snap-in pin 16 while the spring is not under tension.

Figure 22:
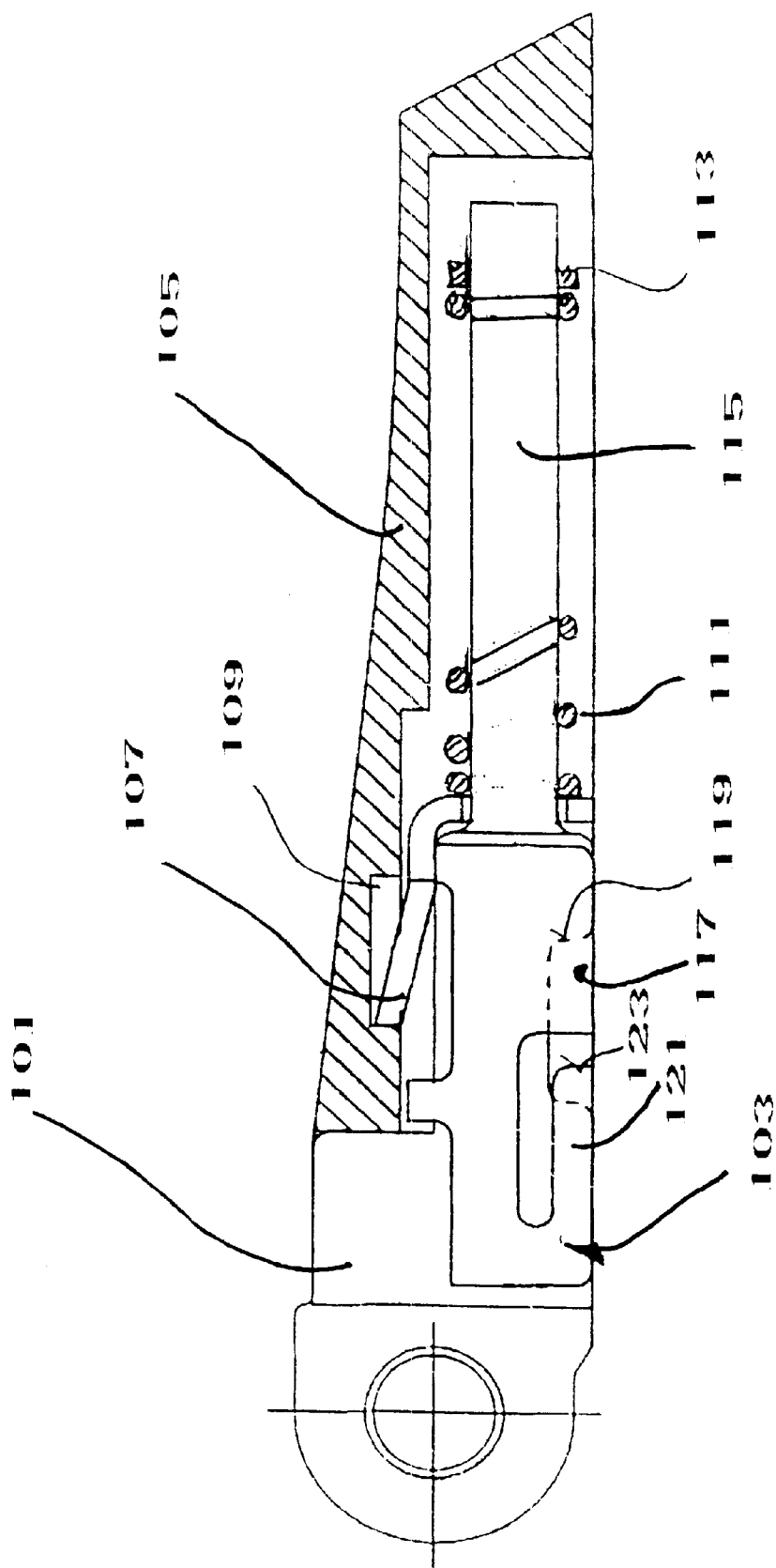
FIGS. 22 and 23 show a partial bow, in cross-section.
Figure 23:
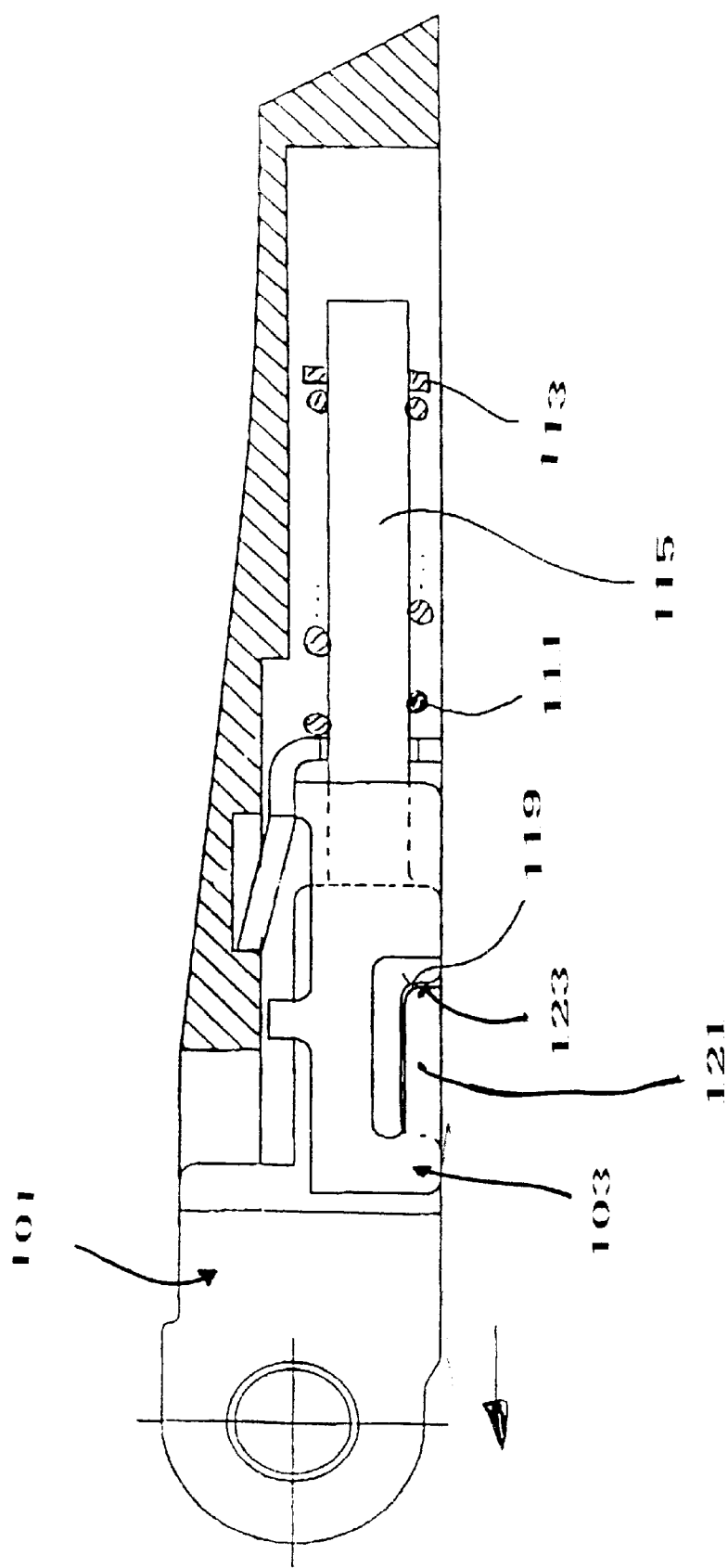

FIGS. 22 and 23 show a spring hinge in a first position and in a second position, respectively.

The spring hinge comprises a sliding element 101, a locking element 103 and a housing 105.

The locking element 103 is provided with a snap-in element 107 which snaps into a recess 109 of the housing 105. The locking element 103 supports one end of a spring 111. The other end of the spring 111 is supported by holding means 113 fixed on a spring guide pin 115 of the sliding element 101. In a preferred embodiment, the function of the holding means 113 is achieved by the pin 115 itself, which will be flattened or pinched in order to support the spring 111.

Figure 25:
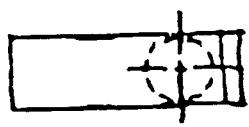
FIG. 25 is an end view of the bow shown in FIG. 24.
Figure 24:
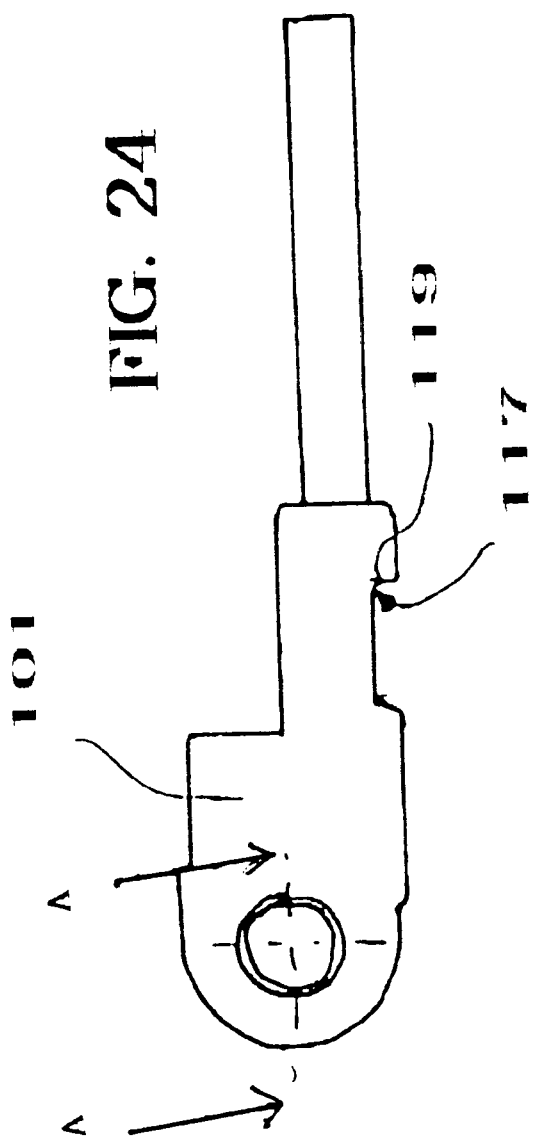
FIG. 24 shows a portion of a bow.
Figure 26:
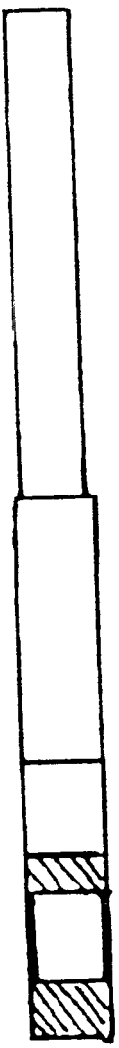
FIG. 26 is a side view of the bow of FIG. 24, taken along section line A—A.

As shown in FIGS. 24, 25, and 26, the sliding element 101 is provided with a recess or groove 117 which has at least one shoulder 119.

Figure 30:
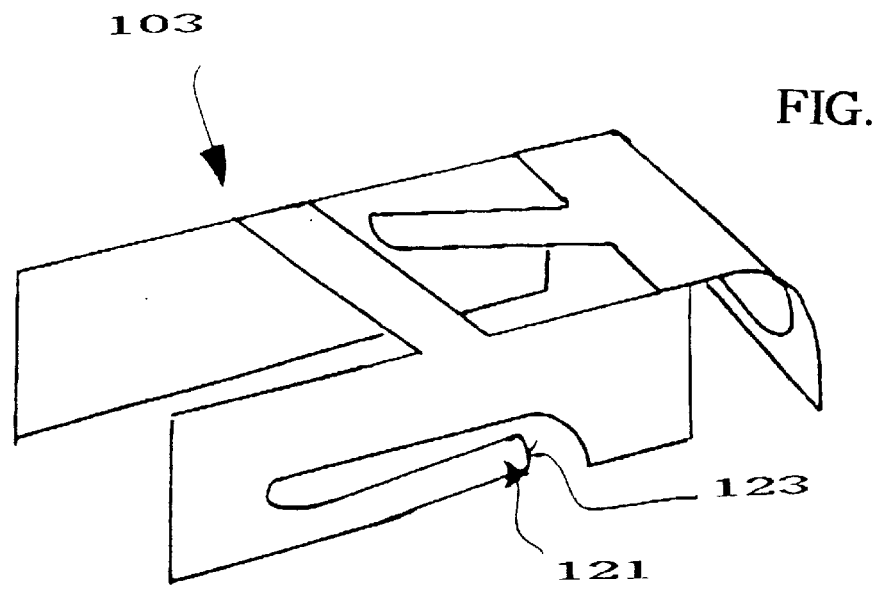
FIG. 30 is a perspective view of the locking element of FIG. 27.
Figure 27:
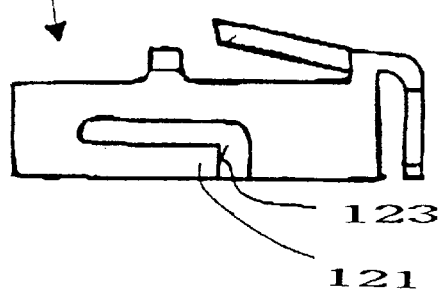
FIG. 27 is a side view of a locking element.
Figure 28:
FIG. 28 is a rear view of the locking element of FIG. 27.
Figure 29:
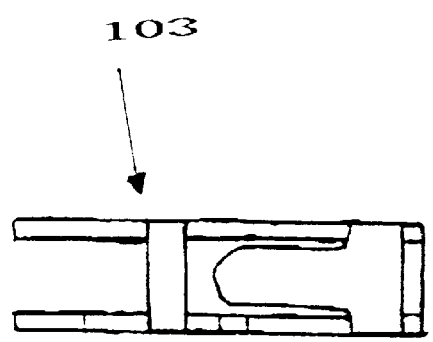
FIG. 29 is a bottom view of the locking element of FIG. 27.

As shown in FIG. 27, or in the perspective view of FIG. 30, the locking element 103 is provided with an arm 121, which arm is extended in a longitudinal direction of the spring hinge and which arm is fixed to the locking element with an end adjacent to the opening of the housing 105. The free end 123 of the arm 121 lies on the opposite side of the opening of the housing 105.

The free end 123 of the arm 121 is bent inwardly as shown in FIG. 30.

The stop means of the spring hinge consists of the recess 117 with the shoulder 119 of the sliding element 101 and the arm 121 with a free end 123. As shown in FIG. 23, the movement of the sliding element 101 against the force of the spring 111 is limited by the shoulder 119 and the recess 117, which strikes the free end 123 of the arm 121 which is bent inwardly into the recess 117.

Figure 31:
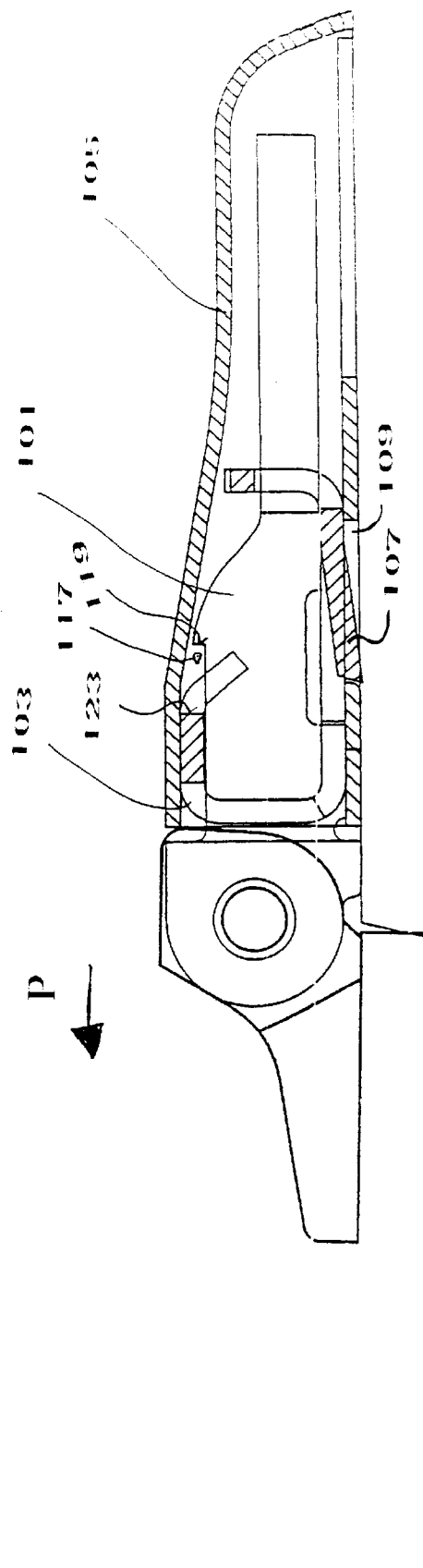
FIG. 31 is a top view in partial cross-section of a bow incorporating the locking element of FIG. 27.
Figure 32:
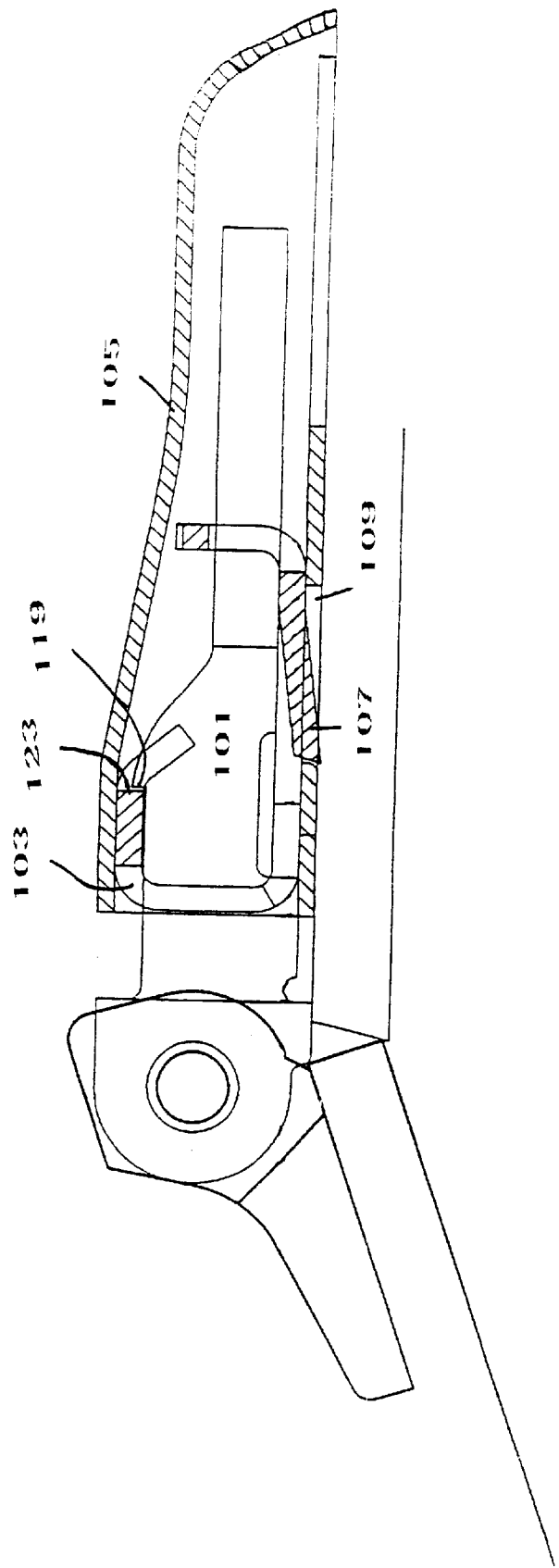
FIG. 32 is a top view in a partial cross-section of the bow of FIG. 31, in a bent position.

In FIGS. 31 and 32, there is shown another embodiment of the present invention, wherein the spring hinge also comprises a sliding element 101 and a locking element 103 which is locked into the housing 105 by a locking pin or tongue 107.

The sliding element 101 is provided with a groove or recess 117 having a shoulder 119. This shoulder 119 cooperates with a shoulder 123 provided on the upper side of the locking element 103.

The movement of the sliding element 101 in the direction of the arrow P is limited by the shoulder 119 which strikes the shoulder 123, as shown in FIG. 32.

The stop means can also comprise a tongue provided on the sliding element and the recess provided in the housing, whereby the movement of the sliding element is stopped by the tongue which snaps into the recess and strikes the shoulder of the recess.

What is claimed is:
1. A spring hinge for spectacles comprising:
   a hollow housing having a longitudinal recess and a stepped recess formed with said longitudinal recess;
   a sliding element, a part of which is displaceable within the housing, said sliding element including a guide pin element;
   a locking element provided within the housing;
   a spring, disposed within said housing, said spring supported by the sliding element and the locking element;
   stop means having two stop elements, wherein
      the first stop element is provided on the sliding element and the second stop element is provided on one of the housing and the locking element in a way that limits the displacement distance of the sliding element against the force of the spring by a predetermined value.
2. The spring hinge according to claim 1, wherein the locking element includes an elastic tongue which is the second stop element, said tongue bent towards the sliding element and cooperating with the first stop element.
3. The spring hinge according to claim 2, wherein the sliding element includes a recess extending in a longitudinal direction, the second stop element engages said recess, a shoulder of said recess forming the first stop element.
4. The spring hinge according to claim 2, wherein the locking element surrounds at least a longitudinal part of the sliding element and works as a guiding device.
5. The spring hinge according to claim 2, wherein the locking element comprises a locking pin and the housing includes a recess, the locking pin adapted to snap into the recess.
6. The spring hinge according to claim 1, wherein the sliding element includes a recess extending in a longitudinal direction, the second stop element engages said recess, a shoulder of said recess forming the first stop element.
7. The spring hinge according to claim 6, wherein the sliding element includes a side and the recess is provided on the side such that it faces a lower side of the housing.

8. The spring hinge according to claim 6, wherein the locking element surrounds at least a longitudinal part of the sliding element and works as a guiding device.

9. The spring hinge according to claim 6, wherein the locking element comprises a locking pin and the housing includes a recess, the locking pin adapted to snap into the recess.

10. The spring hinge according to claim 6, wherein said tongue has a pair of ends, a first end of the tongue formed as part of the locking element and the other end of the tongue adapted to engage the recess of the sliding element.

11. The spring hinge according to claim 1, wherein the locking element surrounds at least a longitudinal part of the sliding element and works as a guiding device.

12. The spring hinge according to claim 11, wherein the locking element comprises a locking pin and the housing includes a recess, the locking pin adapted to snap into the recess.

13. The spring hinge according to claim 11, wherein said tongue has a pair of ends, a first end of the tongue formed as part of the locking element and the other end of the tongue adapted to engage the recess of the sliding element.

14. The spring hinge according to claim 1, wherein the locking element comprises a locking pin and the housing includes a recess, the locking pin adapted to snap into the recess.

15. The spring hinge according to claim 14, wherein said tongue has a pair of ends, a first end of the tongue formed as part of the locking element and the other end of the tongue adapted to engage the recess of the sliding element.

16. The spring hinge according to claim 1, wherein the housing includes a projection, said projection forming the second stop element that engages the recess of the sliding element.

17. The spring hinge according to claim 16, wherein the one side of the housing is formed by a temple, the projection being provided on the temple.

18. The spring hinge according to claim 1, wherein said tongue has a pair of ends, a first end of the tongue formed as part of the locking element and the other end of the tongue adapted to engage the recess of the sliding element.

19. The spring hinge according to claim 18, wherein the locking element and the tongue are formed as one piece.

20. The spring hinge according to claim 1, wherein said tongue has a pair of ends, a first end of the tongue formed as part of the locking element and the other end of the tongue adapted to engage the recess of the sliding element.

* * * * *